United States Patent Office 2,976,268
Patented Mar. 21, 1961

2,976,268

POLYMER OF 2,6-DISUBSTITUTED HEPTA-DIENE-1,6

George Noel Milford, Jr., Waynesboro, Va., and Frederick Theodore Wall, Urbana, Ill., assignors to E. I. du Pont de Nemours and Company, Wilmington, Del., a corporation of Delaware No Drawing. Filed Mar. 13, 1958, Ser. No. 721,084

5 Claims. (Cl. 260—77.5)

This invention is concerned with new and useful linear polymers.

Despite the great amount of research activity on addition-type polymers prepared from vinyl monomers and the great number of combinations of copolymers and types of polymers made from these monomers, the linear polymers made have not had high enough melting points and/or sufficient heat stability. In the present age, such requirements for polymers are becoming more and more important.

It is an object of the present invention to provide new and useful polymers by addition polymerization from ethylenically unsaturated monomeric compounds. Another object is the preparation of linear polymers from selected diolefinic compounds. A further object is the preparation of polymers having improved heat stability and high melting points. Other objects will be apparent in the following discussion.

According to this invention there are provided linear polymers containing the recurring structural unit:

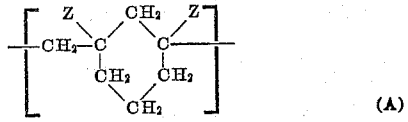

wherein Z is any group which when substituted in the 2 position of propene increases the free-radical polymerizability of the substituted propene as compared to propene itself. Such groups include cyano, carboxyl, carbamyl, and aromatic groups such as phenyl, alkaryl, etc. Z must be a group which does not interfere detrimentally with the linear polymerization of the monomer.

The polymers of this invention can be formed into shaped articles as fibers, films, fibrids (synthetic polymer analogues of beaten cellulose), sheets, and the like from solutions or melts of the polymers. Solutions can be wet- or dry-spun or cast using conventional procedures, precipitated under high shear to yield fibrids, or used as solutions to form protective coatings and paints.

Polymers of this invention, may be prepared from 2,6-disubstituted heptadiene-1,6 compounds of the formula

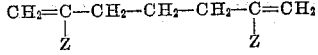

wherein Z is cyano, carboxy, carbamyl or an aromatic group. Such polymers are characterized by high melting points, great heat stability, high strength, high modulus, and good retention of properties at elevated temperatures.

When Z, in either of the above structural formulas, is an aryl or alkaryl group, phenyl or phenylene is preferred over larger groups. Representative alkaryl groups are tolyl, ethyl phenyl, propyl phenyl, butyl phenyl, pentamethyl ethyl phenyl. It will be obvious to one skilled in the art that Z may be any group which enhances the linear polymerization without interfering by causing crosslinking or other side reactions.

The 1,6-heptadienes that are disubstituted in the (2,6) positions with a group that greatly increases the polymerizability of propene when present in the 2 position, such as cyano, carboxy, carbamyl, and aryl, may be polymerized by any suitable means. A choice of types of polymerization initiation (free-radical, thermal, cationic, anionic, coordination catalysis) is also permissible.

The polymerizations may be carried out in any desired manner, as bulk, emulsion, disperse (pearl) and solution including those systems using a solvent for the monomer that is a non-solvent for the polymer and those systems using a diluent that is a solvent for both monomer and polymer. Molecular weight of the polymers appears to be in the range of 25,000 to 450,000, based on viscosity measurements.

The monomers of this invention can be copolymerized with monovinyl compounds to obtain linear copolymers. Such comonomers should have a reactivity equal to and preferably less than the reactivity of the heptadiene component in the polymerization system under consideration.

The monomers of this invention can also be copolymerized with similar monomers, as for example 2,6-dicyanoheptadiene-1,6 and 2,6-diphenylheptadiene-1,.6 to give linear polymers containing intralinear cyclic groups. Preferably copolymers of this invention contain at least 5% combined, 2,6-disubstituted heptadiene-1,6 compounds and more preferably at least 50% of such compounds by weights.

The expression "inherent viscosity" as used herein is defined as:

$$\frac{\ln (n)_r}{c}$$

wherein $c$ is the concentration in grams of the polymer in 100 ml. of the solvent, $(n)_r$ is the relative viscosity which is the ratio of the flow times in a viscosimeter of polymer solution and of the solvent, and ln is the logarithm to the base $e$. The measurements are made on solutions containing 0.5 gram per 100 ml. of solvent.

The expression "intrinsic viscosity" signifies the value of ln $(n)_r$ at the ordinate axis intercept (i.e., when $c$ equals 0) in a graph of $$\frac{\ln (n)_r}{c}$$

as ordinate with $c$ values as abscissas.

The expression "polymer melt temperature" as used herein signifies the minimum temperature at which a sample of the polymer leaves a wet, molten trail when it is stroked with moderate pressure across a smooth surface of a heated block.

The following examples illustrate specific embodiments of the invention. All parts and percentages are by weight unless otherwise indicated.

*Example 1*

2,6-dicarboxyheptadiene-1,6 is prepared as follows: To a solution of 18.4 grams of heptadiene-1,6 in 60 ml. ethanol is added 15 ml. of glacial acetic acid and 7 ml. of water. To this stirred mixture is added 2 ml. of a solution containing 16 ml. of nickel carbonyl in 40 ml. of ethanol. The temperature of the reactants is raised to 75–80° C. and the remainder of the nickel carbonyl solution added over a period of 30 minutes. Stirring is continued for a further 15 minutes and excess nickel carbonyl and a portion of the ethanol removed by distillation on the same bath. The residual oil is added to 500 ml. of 5% sulfuric acid and extracted with three 500 ml. portions of ether. The combined ether extract is washed with three 300 ml. portions of saturated aqueous sodium bicarbonate, and the combined bicarbonate extract is acidified with 10% sulfuric acid. A light brown gummy solid separates and is extracted with two 500 ml. portions of ether. After drying over sodium sulfate, the ether extract is evaporated to leave a yellow brown viscous oil. Extraction of the oil with two 200 ml. portions of boiling water produces a colorless, crystalline solid with a melting point of 84–86° C. The solid is recrystallized from boiling water to give 2.25 grams of a colorless, crystalline solid melting sharply at 95° C., identified by analysis to be 2,6-dicarboxyheptadiene-1,6.

Calculated for $C_9H_{12}O_4$: C, 58.7; H, 6.5%. Found: C, 59.0; H, 6.6%.

Infrared spectroscopy confirmed the assigned structure.

A solution is prepared by mixing 0.2 gram of 2,6-dicarboxyheptadiene-1,6, 10 ml. of air-free water and sufficient 5% aqueous NaOH to dissolve the acid. The solution is stirred under nitrogen, 0.005 gram of $\alpha,\alpha$-azodiisobutyroamidine dihydrochloride is added and the solution heated to 60° C. for one hour with no change in appearance. Acidification with 5% sulfuric acid precipitates 0.15 gram of a colorless polymer which has a viscous melt at about 325° C. Infrared spectroscopy indicates that the polymer contains few carbon-carbon double bonds. It is soluble in aqueous sodium hydroxide.

*Example 2*

A suspension of 120.8 grams (0.338 mole) triphenylmethylphosphonium bromide in 500 ml. of dry glycoldimethyl ether is prepared in a 2-liter, 3-neck flask equipped with a stirrer, dropping funnel, condenser and a nitrogen atmosphere. To this suspension is added 0.369 mole of phenyl lithium in 220 ml. diethyl ether dropwise over ¾ of an hour. A solution is made of 40 grams (0.158 mole) of 1,3-dibenzoylpropane in 200 ml. of glycol-dimethyl ether and the solution added to the above reaction mixture dropwise over a one hour period. The mixture is then refluxed for 20 hours. The glycoldimethyl ether is removed under vacuum to near dryness and about 700 ml. of ether added. The ethereal filtrate is evaporated to about 200 ml., washed with water until free of alkali and the ether layer then dried over sodium sulfate and evaporated to dryness to give 39 grams of a dark yellow oil. Distillation of this oil in the presence of 0.1 gram of di-t-butyl-p-cresol through a Vigreux column at about 0.1 mm. of mercury (absolute) yields 25.9 grams of a colorless oil (65% yield) having an $n_D^{25}$ of 1.5800–1.5805 and a boiling point of 108° C./0.03 mm. and analyzing correctly for 2,6-diphenylheptadiene-1,6.

Calculated for $C_{19}H_{20}$: C, 91.9; H, 8.1. Found: C, 91.8; H, 7.8.

One milliliter (about 1 gram) of 2,6-diphenylheptadiene-1,6 and two small drops of cumene hydroperoxide (about 0.05 gram) are sealed under nitrogen in a 5 ml. tube and the tube kept in boiling water for 5 days. The clear product is precipitated twice from chloroform in methanol to give 0.36 gram of a white polymer having an inherent viscosity in benzene of 0.35 and a polymer melt temperature of about 265° C. This melted polymer is stable and does not discolor at temperatures as high as 300° C.

One milliliter of 2,6-diphenylheptadiene-1,6 is dissolved in 3 ml. of carbon disulfide maintained under dry nitrogen. The solution is cooled in a solid carbon dioxide-acetone bath and sprayed with $BF_3$ gas. After 20 hours at the temperature of the Dry Ice bath, the cold slurry is precipitated in a methanol-acetone mixture to yield 0.05 gram of polymer (5% yield) having a melt temperature of about 290° C. The use of n-hexane in a similar manner gives a 100% yield of polymer.

To 6 ml. of decahydronaphthalene is added 0.6 ml. of 0.001 molar $TiCl_4$ in decahydronaphthalene followed by 1 ml. of a 0.001 molar solution of aluminum isobutyl in decahydronaphthalene. After 10 minutes of stirring, 1.5 ml. of 2,6-diphenylheptadiene-1,6 is added. The mixture is stirred for 4 days at room temperature under a nitrogen atmosphere and then poured into ethanol. A white polymer in the amount of 1.06 grams and having a polymer melt temperature of about 140° C. is obtained.

A small flattened piece of lithium metal is stirred with 5 mg. of naphthalene in 10 ml. of tetrahydrofuran under deoxygenated nitrogen in a 50 ml. flask until a faint green color begins to appear. One milliliter of 2,6-diphenylheptadiene-1,6 is then injected into the flask, whereupon the green color disappears, and after a few seconds a red coloration appears. Precipitation of the polymer in methanol followed by washing with methanol and drying gives 0.8 gram of a polymer (80% yield) having an inherent viscosity in benzene of 0.49 and a polymer melt temperature of about 300° C. at which temperature the polymer is stable.

The following properties are observed with respect to the polymers prepared above. All polymers are soluble in benzene, chloroform, and tetrahydrofuran. The polymers can be cast from melts or solutions into clear films. Infrared spectra of all polymers, indicating that very few carbon-to-carbon double bonds are present, show that the polymers have the recurring structure of Formula A.

*Example 3*

To the reaction product of 36.8 grams (1.60 moles) of sodium and 800 ml. of absolute ethanol stirred in a 5-liter, 3-neck flask equipped wtih a dropping funnel, mechanical stirrer, and a reflux condenser surmounted by a calcium chloride tube is added a mixture of 1091 grams (9.65 moles) of ethyl cyanoacetate and 160.8 grams (0.80 mole) of trimethylene bromide. The reaction mixture is stirred at reflux for 27 hours, cooled, and filtered. Most of the ethanol is removed from the filtrate at reduced pressure. Residual oil is dissolved in ether and washed three times with water. Ether and excess ethyl cyanoacetate are removed from the dried ether solution by distillation at reduced pressure. The products of three such runs are combined and fractionally distilled through a 6-inch Vigreux column to give 147 grams (31%) of a light yellow oil, B.P. 179° C./0.4 mm. Hg, $n_D^{25.5}$ 1.4590, and analyzing correctly for $\alpha,\alpha'$-dicarboethoxypimelonitrile.

Calculated for $C_{13}H_{18}N_2O_4$: C, 58.63; H, 6.81; N, 10.52. Found: C, 58.7; H, 6.8; N, 11.0.

A mixture of 53.36 grams (0.20 mole) of the above product and 75 ml. of absolute ethanol are added to a solution of 22.44 grams (0.40 mole) of potassium hydroxide in 300 ml. of absolute ethanol. The solution almost immediately darkens to a reddish color, depositing a sticky residue on the sides of the flask. The mixture is stirred at reflux overnight and a potassium salt which separates is collected on a filter, washed with ether and dried overnight in a vacuum desiccator. The dried salt (44.3 grams) is dissolved in 150 ml. of distilled water in a 1-liter, 3-neck flask equipped with stirrer, gas inlet tube and reflux condenser. The solution is cooled to −5 to −10° C. and acidified to pH 2 with diluted HCl. Dimethylamine is then bubbled at a moderate rate for one hour into the cold solution. After the temperature rises to 15° C., 90 grams of 37% formaldehyde is added and dimethylamine is passed in for another hour and the solution refluxed for 8 additional hours. The cold reaction mixture is extracted with three 50 ml. portions of ether and the ether extract provides 10.5 grams of a liquid which upon fractionation through a 10-inch Holtzmann column yields 7.38 grams of a colorless liquid having a boiling point of 103° C./1.5–2.0 mm. Hg, an $n_D^{28.2}$ of 1.4669 and analyzing correctly for 2,6-dicyanoheptadiene-1,6.

Calculated for $C_9H_{10}N_2$: C, 73.93; H, 6.89; N, 19.16. Found: C, 73.3; H, 6.46; N, 19.0.

The infrared spectra of the product are similar to those of acrylonitrile and methacrylonitrile having nitrile absorption at $4.5\mu$ and double bond absorption at 10.6, 6.14 and $3.2\mu$.

Another means of preparing this monomer is by using 2,6-dicarbamylheptadiene-1,6 as prepared in Example 4 (18.0 grams in 36 ml. of dry pyridine, cooled to 0° C. and 35.0 grams of benzene sulfonyl chloride). The acid chloride is added drop wise and the reaction temperature warmed to room temperature and stirred on a steam bath for 20 minutes to afford a clear solution. The solution is then poured into 250 ml. of distilled water with stirring and the mixture extracted with ether. The dried ether extract is concentrated under vacuum to remove the ether. The crude dinitrile is then treated with 24.8 grams of dry pyridine and 24.1 grams of benzene sulfonyl chloride, allowed to stand at room temperature for 2 hours and recovered as above. A 68.8% yield of the dinitrile (based on the amide) is obtained having essentially the same properties as noted above.

A solution containing 0.47 gram of the purified 2,6-dicyanoheptadiene-1,6 is dissolved in 3 ml. of cyclic tetramethylene sulfone containing 0.005 gram of benzoin. Nitrogen gas is maintained over the surface of the solution while the tube is exposed to an ultraviolet light source located 12 inches from the tube. After 6.5 hours, the viscous solution is poured into methanol with stirirng, the precipitated polymer washed with methanol and dried. A 53% yield of polymer having an intrinsic viscosity in dimethylformamide of 1.26 is obtained. The polymer is completely soluble in dimethylformamide.

Substitution of dimethylformamide for the tetramethylene sulfone yields a polymer with an intrinsic viscosity of 0.73 and a conversion of 55% while the use of butyrylactone gives an intrinsic viscosity of 1.03 and a conversion of 55%.

The polymer prepared in tetramethylene sulfone is dissolved in dimethylformamide to form a 15% solution which is cast on a glass plate to yield a good clear film. The polymer itself shows no signs of melting, sticking or discoloration upon heating at 300° C. for 15 minutes in the open air on a melting point block.

A solution containing 2.30 grams of 2,6-dicyanoheptadiene-1,6 and 50 mg. of α,α′-azobis-(α,γ-dimethylvaleronitrile) in 100 ml. of absolute ethanol is refluxed for 15 hours. After cooling, filtering, and washing the pink colored precipitate with ethanol, 1.0 gram (44% yield) of the polymer is obtained, with an inherent viscosity in DMF of 0.15. The polymer is readily soluble in solvents for polymethacrylonitrile, such as dimethylformamide, dimethylsulfoxide, m-cresol, nitromethane, N-methylpyrrolidone, and dimethylacetamide. Infrared analysis of the polymer indicates a maximum of about 6 mole percent vinyl unsaturation. Despite the indicated presence of unsaturation, however, the polymer is stable and remains soluble even after prolonged standing in air.

Differential thermal analysis of the polymer reveals a very slight exothermic reaction in the range 285–340° C. with slight discoloration. In contrast, polyacrylonitrile, to which it is structurely similar, undergoes a highly exothermic reaction at 285° C., accompanied by extensive darkening, and polymethacrylonitrile depolymerizes at 250° C.

*Example 4*

2,6-dicarboxyheptadiene-1,6 (26.6 grams) was converted to the diacid chloride by heating at 60° C. for 2 hours with 51.8 grams thionyl chloride in a dry system. The unreacted thionyl chloride was removed under reduced pressure to give 32.1 grams of crude diacid chloride which was slowly poured with stirring into 300 ml. of concentrated NH₄OH cooled to 0° C. The white 2,6-dicarbamylheptadiene-1,6 was removed by filtration. Concentration of the filtrate to ½ its original value gave a second portion of the diamide making a total of 17.4 grams. Recrystallization of the diamide from water affords a crystalline product which is readily polymerized in a solution with formic acid using benzoin and ultraviolet light to give high molecular weight soluble polymers having the structure of Formula A in which Z is carbamyl. Similar results are obtained using tetrafluoropropanol-2,2,3,3 as solvents.

*Example 5*

To a solution of 1.5 grams of sodium lauryl sulfate in 100 milliliters of deionized water in a flask is added 0.60 gram of 2,6-dicyanoheptadiene-1,6, 11.4 grams of freshly distilled acrylonitrile, 0.25 gram of sodium meta-bisulfite, 0.03 gram of potassium persulfate and 0.005 milliliter of beta-mercapto-ethanol. The entire system is stirred well under an atmosphere of nitrogen and the temperature of the mixture maintained at 55° C. At the end of 2½ hours, copolymer is recovered by adding the partially broken dispersion of polymer to methanol. The copolymer is collected by filtration, washed and dried to give a 72.3% yield. It has an intrinsic of 1.71 as measured in dimethylformamide, and is completely soluble. Absolutely clear films are cast from solutions of this copolymer in dimethylformamide. The copolymer contains 6% by weight of combined 2,6-dicyanoheptadiene-1,6.

A solution of copolymer prepared as above in dimethylformamide containing 20% of copolymer is extruded at 110° C. through a spinneret into a spinning cell containing air at 180° C. and the yarn wound up at 100 y.p.m. The yarn is drawn to 4 times its original length in 98° water and the drawn yarn then relaxed by boiling off. The relaxed yarn has a tenacity of 3.95 g.p.d. with an elongation at the break of 22% and an initial modulus of 68.6.

A copolymer from a similar polymerization but using 15% 2,6-dicyanoheptadiene-1,6 was spun and drawn 4× to strong filaments having 90° C. wet initial modulus of 10 g.p.d. and recovery from 3% elongation in 50° C. water of 56%. Typical values for fiber prepared in a similar manner from acrylonitrile homopolymer are 3 g.p.d. and 40%, respectively.

The claimed invention:
1. A linear polymer having the recurring structural unit.

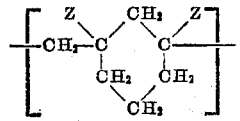

in which Z is a monovalent group selected from the class consisting of cyano, carboxyl, carbamyl, aryl, and alkaryl which does not interfere detrimentally with linear polymerization of 1,6-heptadiene having Z attached to each of the 2- and 6-carbon atoms, said polymer having an inherent viscosity of at least 0.15.

2. The polymer of claim 1 in which Z is phenyl.
3. The polymer of claim 1 in which Z is cyano.
4. A linear copolymer of a 1,6-heptadiene and a vinyl compound capable of addition polymerization, said heptadiene having the structural formula

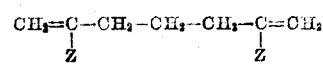

where Z is a monovalent group selected from the group consisting of cyano, carboxyl, carbamyl, aryl, and alkaryl which does not interfere detrimentally with polymerization of the heptadiene, said copolymer having an inherent viscosity of at least 0.15.

5. The copolymer of claim 4 in which the vinyl compound is acrylonitrile.

References Cited in the file of this patent
UNITED STATES PATENTS

| | | |
|---|---|---|
| 2,457,306 | Dreyfus et al. | Dec. 28, 1948 |
| 2,832,759 | Nowlin et al. | Apr. 29, 1958 |

UNITED STATES PATENT OFFICE
CERTIFICATION OF CORRECTION

Patent No. 2,976,268 March 21, 1961

George Noel Milford, Jr., et al.

It is hereby certified that error appears in the above numbered patent requiring correction and that the said Letters Patent should read as corrected below.

Column 2, line 57, for "heptadiene" read -- heptadiyne --; line 66, for "same" read -- steam --.

Signed and sealed this 8th day of August 1961.

(SEAL)
Attest:

ERNEST W. SWIDER
Attesting Officer

DAVID L. LADD
Commissioner of Patents